United States Patent [19]

Kurihara

[11] Patent Number: 5,801,750
[45] Date of Patent: Sep. 1, 1998

[54] INFORMATION OFFERING SYSTEM

[75] Inventor: Akira Kurihara, Tokyo, Japan

[73] Assignee: Sony Corporation, Tokyo, Japan

[21] Appl. No.: 492,794

[22] Filed: Jun. 20, 1995

[30] Foreign Application Priority Data

Jun. 24, 1994 [JP] Japan .................................. 6-142721

[51] Int. Cl.$^6$ ........................................................ G06F 13/00
[52] U.S. Cl. ............................. 348/7; 348/17; 395/200.47
[58] Field of Search ............................. 395/200, 20, 337,
395/200.09, 200.47; 382/157; 348/7, 12,
13, 8, 14, 17

[56] References Cited

U.S. PATENT DOCUMENTS

| | | | |
|---|---|---|---|
| 5,119,188 | 6/1992 | McCalley et al. | 348/6 |
| 5,197,127 | 3/1993 | Waclawsky et al. | 395/200.54 |
| 5,247,347 | 9/1993 | Litteral et al. | 348/7 |
| 5,483,278 | 1/1996 | Strubbe et al. | 348/7 |
| 5,523,796 | 6/1996 | Marshall et al. | 348/589 |
| 5,539,635 | 7/1996 | Larson | 364/479.04 |
| 5,559,549 | 9/1996 | Hendricks et al. | 348/6 |
| 5,594,794 | 1/1997 | Eyer et al. | 380/20 |
| 5,640,484 | 6/1997 | Mankovitz | 386/83 |
| 5,659,351 | 8/1997 | Huber | 348/7 |

*Primary Examiner*—Parshotam S. Lall
*Assistant Examiner*—Kenneth R. Coulter
*Attorney, Agent, or Firm*—Frommer Lawrence & Haug LLP; William S. Frommer

[57] ABSTRACT

An information offering system which allows users to obtain desired information readily while minimizing the effect that the users' knowledge and/or skill level has on the information retrieval time and information retrieval cost. The information offering system is composed of a center CE as an information offerer and user terminals TE which receive offers of information from the center CE. The center CE is provided with a transmission antenna AT for transmitting antenna radio wave RF1 to a communication satellite SA. The communication satellite SA transmits re-transmission radio wave RF2 to the terminal TE. Thereby, a satellite broadcasting network is constructed as a first communication mode for offering partial information from the center CE to the terminal TE. A communication network such as ISDN using a cable CA as a medium is also constructed between the center CE and the terminal TE to enable transmission of whole information specified by the terminal TE from the center CE to the terminal TE in a second communication mode.

30 Claims, 8 Drawing Sheets

1

INFORMATION OFFERING SYSTEM

BACKGROUND OF THE INVENTION

1. Field of the Invention

The present invention relates to an information offering system composed of a center which offers information and a plurality of terminals which receive the offer of the information from the center.

2. Description of Related Art

As an information offering system composed of a center which offers information and a plurality of terminals which receive the offer of the information from the center, a database system or a personal computer (PC) communication system in which a center is connected with terminals via telephone lines for example to allow users, i.e. the terminals, to take out desired information from the center has spread.

In such a database system or PC communication system, the user retrieves and receives necessary information by refering to directory information (content information) supplied from the center to the terminal while the line is connected.

In the conventional information offering system described above, the time it takes a user to draw out desired information depends largely on the user's knowledge and/or level of skill in the system. That is, information retrieval time may differ largely among users. Further, because the user is charged generally in correspondence to a connected time of the center and the terminal in the database system or PC communication system, information retrieval cost may differ largely among users. Still more, because the connected time of the center with the terminal is prolonged when the user is not accustomed to the operation, there arises a problem that utility factors of both the line and the host computer of the center drop.

Accordingly, it is an object of the present invention to solve the aforementioned problems by providing an information offering system which allows the user to obtain desired information efficiently while minimizing the effect that the user's knowledge and/or skill level has on the information retrieval time and information retrieval cost.

SUMMARY OF THE INVENTION

In an information offering system described in claim 1 devised to achieve the aforementioned goal and comprising a center (e.g. a center CE shown in FIGS. 1 and 2) which offers information and terminals (e.g. a terminal TE shown in FIGS. 1 and 3) which receive the offer of the information from the center CE, the center CE comprises first information storage means (e.g. an information storage device 1 in FIG. 2) for storing whole information to be offered to the terminal, first transmitting means (e.g. a satellite line interface section 10 in FIG. 2) for transmitting partial information containing part of the whole information stored in the first information storage means to the terminal in a first communication mode, and second transmitting means (e.g. a communication interface section 9 in FIG. 2) for transmitting the whole information specified by the terminal TE based on the partial information to the terminal in a second communication mode, and the terminal TE comprises first receiving means (e.g. a satellite line interface section 31 in FIG. 3) for receiving the partial information transmitted by the first transmitting means of the center CE, second information storage means (an information storage device 22 in FIG. 3) for storing the partial information received by the first receiving means, displaying means (e.g. a displaying

2 circuit 24 and display unit 29 in FIG. 3) for reading the partial information stored in the second storage means to display on a screen, information specifying means (e.g. an operation unit 25 in FIG. 3) for generating, by referencing the partial information displayed on the screen, an instruction signal for instructing the center to transmit the whole information and for transmitting the instruction signal to the center either in the first or second communication mode, and second receiving means (e.g. a communication interface section 30 in FIG. 3) for receiving the whole information transmitted by the second transmitting means in response to the instruction signal.

The information offering system described in claim 2 is characterized in that the partial information is stored in the first storage means in advance.

The information offering system described in claim 3 is characterized in that the partial information contains an ID indicating a storage location of the whole information in the first storage means, a file name of the whole information and a sample information created by cutting out the information from the whole information.

The information offering system described in claim 4 is characterized in that the center further comprises means (e.g. a CPU 4 in FIG. 2) for generating a parameter representing an information amount of the partial information and that the first transmitting means transmits information in order of the parameter, ID, file name and sample information to the terminal.

The information offering system described in claim 5 is characterized in that the terminal further comprises means (e.g. a CPU 26 in FIG. 3) for creating content information by using the file name contained in the partial information and that the displaying means displays the content information on the screen.

The information offering system described in claim 6 is characterized in that the terminal further comprises means (e.g. the operation unit 25 in FIG. 3) for specifying the corresponding sample information from the content information and that the displaying means displays the specified sample information on the screen.

The information offering system described in claim 7 is characterized in that the instruction signal contains an user ID and that the center further comprises means (e.g. the CPU 4 in FIG. 2) for determining, upon receiving the instruction signal, whether the pertinent user is a legitimate user or not based on the user ID. The second transmitting means transmits the whole information to the terminal only when the user is determined to be a legitimate user by the determining means.

The information offering system described in claim 8 is characterized in that the terminal further comprises means (e.g. the CPU 26 in FIG. 3) for comparing the parameter indicating an information amount of the partial information with a storable capacity of the second storage means and outputting the comparison result, means (e.g. the CPU 26 in FIG. 3) for determining whether all of the partial information can be written into the second storage means based on the comparison result, and writing means (e.g. the CPU 26 in FIG. 3) for writing all of the partial information into the second storage means when it is determined to be writable.

The information offering system described in claim 9 is characterized in that the first communication mode is a broadcasting radio wave line and the second communication mode is a cable line.

In the information offering system constructed as described in claim 1, the partial information transmitted from the center to the terminal is distributed in the broadcasting mode for example and the desired whole information is specified by the terminal in the off-line mode from the received partial information. Then, the specified whole information is transmitted from the center to the terminal with the communication line using a cable for example. Accordingly, the information can be retrieved in the off-line mode, allowing the user to obtain the desired information while minimizing the effect that the user's knowledge and/or skill level has on the information retrieval time and information retrieval cost.

Further, the partial information sent from the center is displayed visually on the display unit of the terminal and the user can specify desired whole information by the operation unit. Then, an information identifying ID of the whole information specified by the operation unit is transmitted from the terminal to the center by the communication line using the cable for example and the center which has received the information identifying ID transmits the whole information which corresponds to the pertinent ID to the terminal through the communication line using the cable. Accordingly, the user can specify and obtain the desired whole information based on the partial information visually displayed on the display unit and the specified whole information is taken in automatically from the center to the terminal.

In the information offering system constructed as described in claim 3, because the partial information transmitted in the first communication mode and the whole information transmitted in the second communication mode each have a common information identifying ID, the whole information specified by the terminal may be readily retrieved at the center.

In the information offering system constructed as described in claim 8, an information amount of the partial information to be sent from the center is compared with an empty capacity of the information storage device in the terminal. Then, when the empty capacity of the information storage device of the terminal is larger than the information amount of the partial information to be sent from the center, a series of partial information is transmitted from the center to the terminal in batch. Accordingly, a whole number of partial information may be always transmitted to the terminal.

In the information offering system constructed as described in claim 9, because the broadcasting mode by means of antenna radio wave is adopted as the first communication mode and the on-line mode by means of the cable is adopted as the second communication mode, partial information may be offered in a broad range and whole information may be offered only to the users needing the information in the on-line mode using the cable lines, allowing to reduce the operation cost of the whole system.

The above and other related objects and features of the invention will be apparent from a reading of the following description of the disclosure found in the accompanying drawings and the novelty thereof pointed out in the appended claims.

DETAILED DESCRIPTION OF PREFERRED EMBODIMENTS

Figure 1:
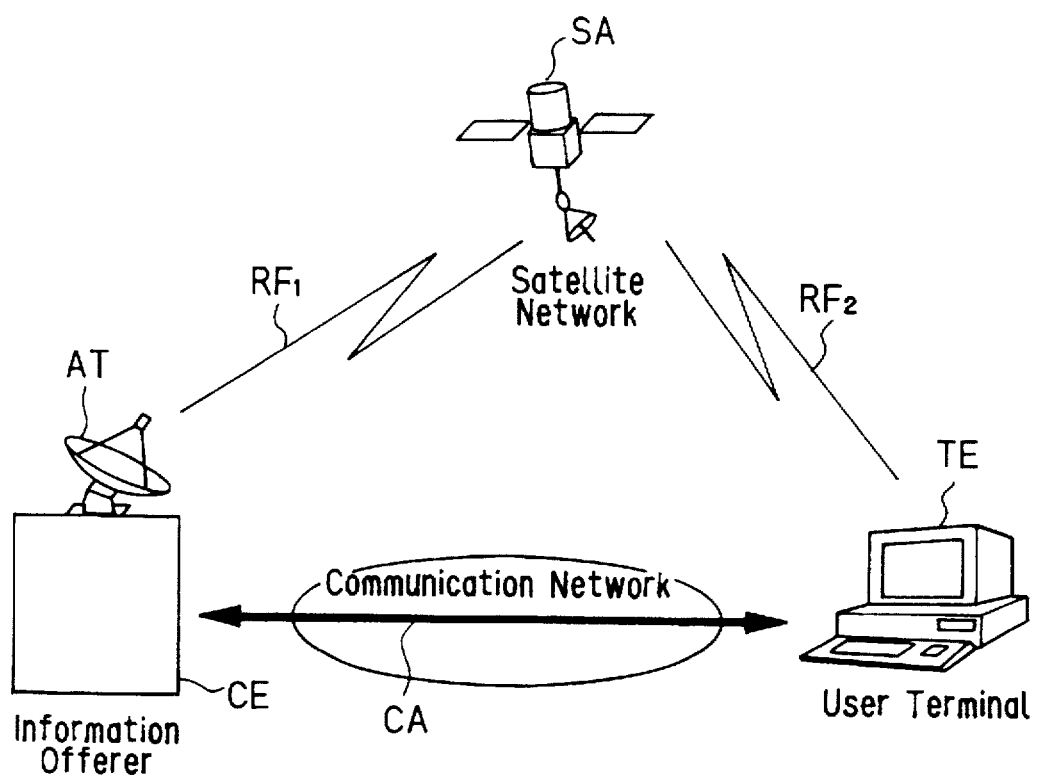
FIG. 1 is a block diagram illustrating a basic structure of a communication system of an information offering system of the present invention.

The present invention will be explained below on the basis of preferred embodiments shown in the drawings. FIG. 1 is a block diagram illustrating a basic structure of an information offering system of the present invention.

As shown in FIG. 1, the information offering system of the present invention comprises a center CE as an information offerer and terminals TE, i.e. user terminals, which receive the offer of the information from the center CE. The center CE is provided with a transmission antenna AT for transmitting antenna radio wave RF1 to a communication satellite SA and the communication satellite SA transmits re-transmission radio wave RF2 to the terminals TE. Thereby, a satellite broadcasting network in a first communication mode for providing partial information from the center CE to the terminals TE is constructed.

A communication network using a cable CA as a medium such as ISDN is also constructed between the center CE and the terminals TE to allow to transmit whole information specified by the terminal TE in a second communication mode by means of a line transmission mode.

Figure 2:
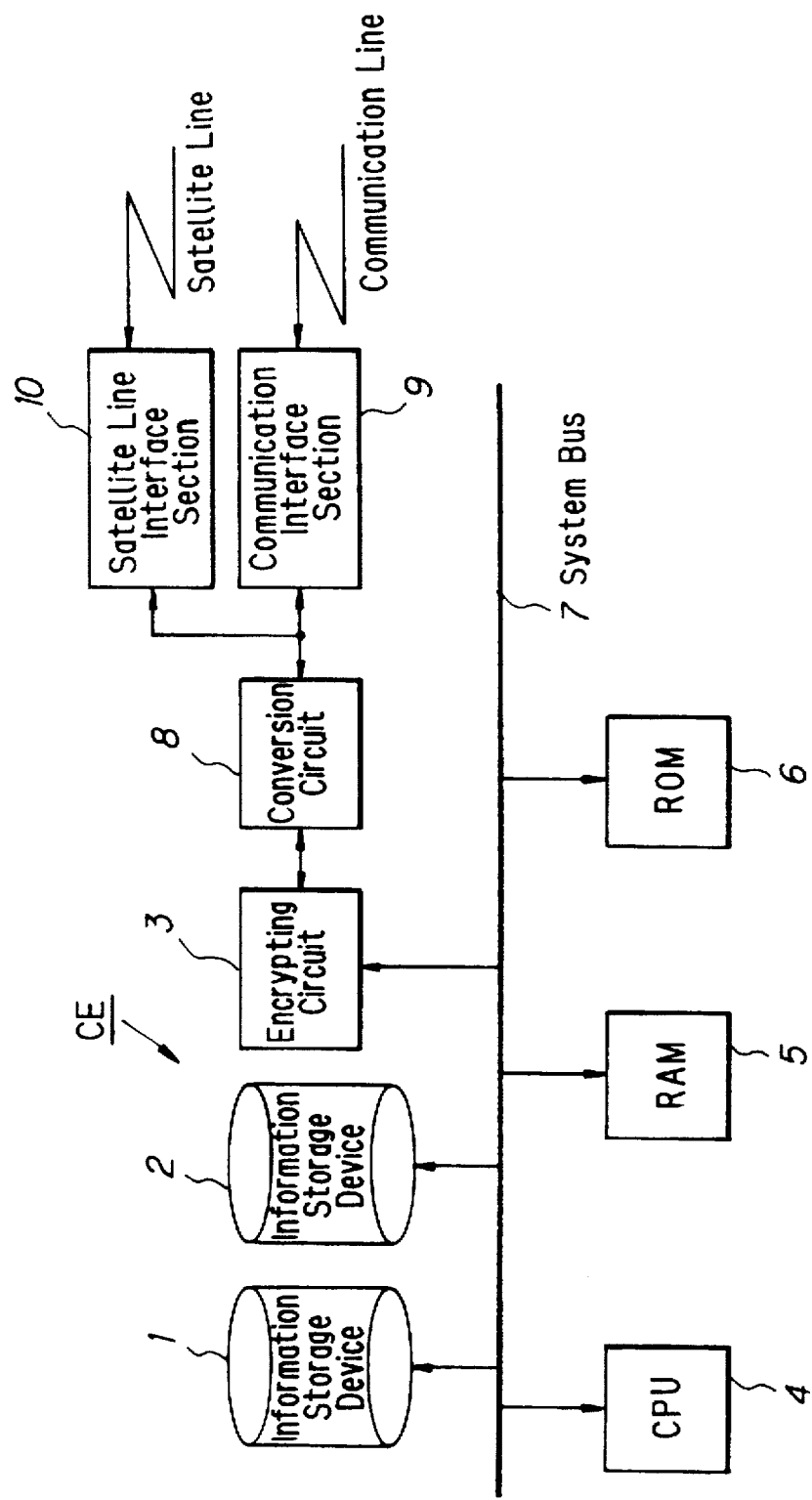
FIG. 2 is a block diagram illustrating a structure of one preferred embodiment of a center of the information offering system of the present invention.

FIG. 2 is a block diagram illustrating a structure of the center CE. That is, in the center CE, an information storage device 1 as information storage means for storing information to be offered to each terminal TE, a management information storage device 2 for storing accounting information and user management information per each user, an encrypting circuit 3 for encrypting information to be sent out, a central processing unit (CPU) 4 for executing a control program, a RAM 5 for storing the present status (for temporarily storing an operation result in an arithmetic operation process), and a ROM 6 for storing a running program of the CPU 4 and management information (e.g. hardware specifications indicating a capacity size for example) of the information storage device 1 are each connected to a system bus 7 of the CPU 4 comprising a data bus, address bus and control bus.

The encrypting circuit 3 is connected with a conversion circuit 8 for converting information to be sent out to be able to send out to the lines and the conversion circuit 8 is connected with a communication interface section 9 for outputting information to the cable line and a satellite line interface section 10 for outputting information to the satellite broadcasting line.

Figure 3:
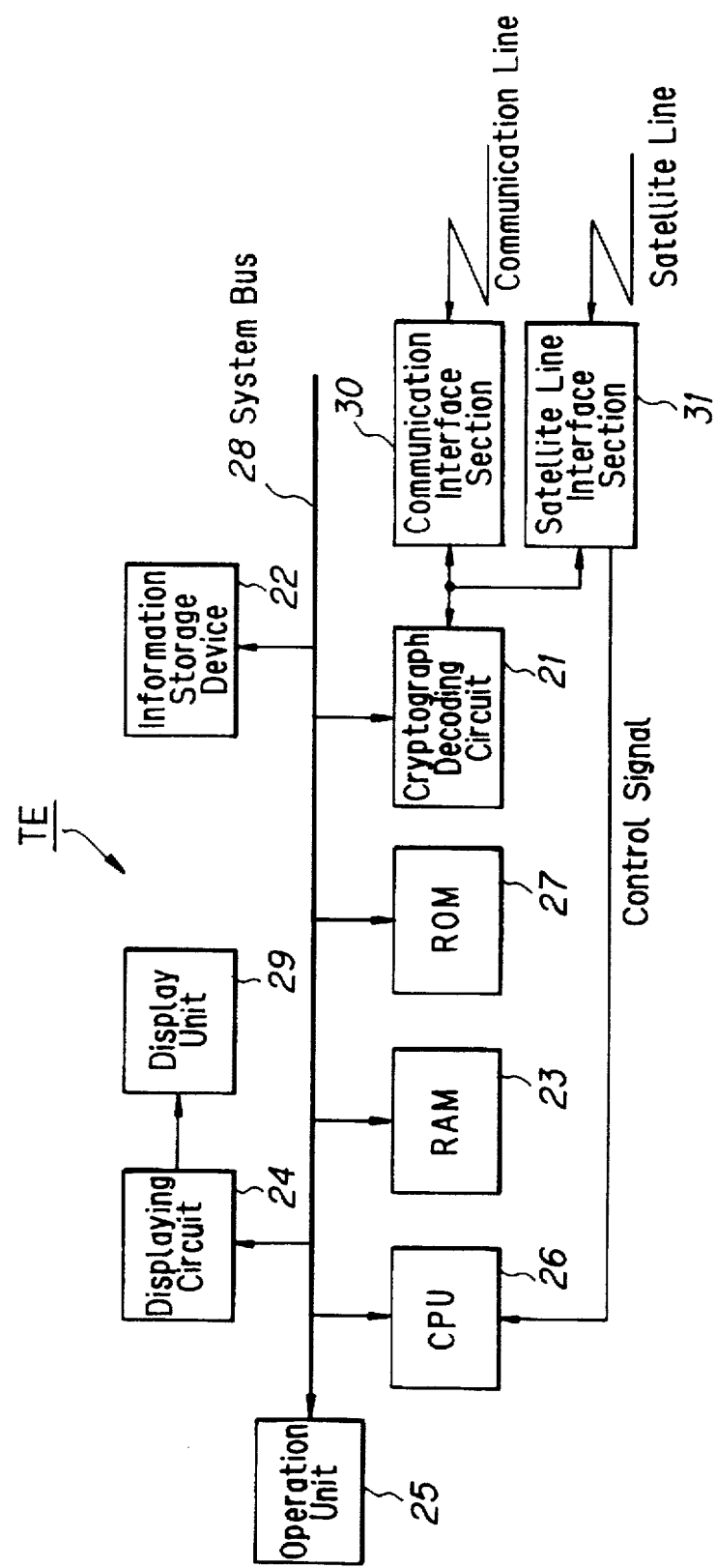
FIG. 3 is a block diagram illustrating a structure of one preferred embodiment of a terminal TE of the information offering system of the present invention.

FIG. 3 is a block diagram illustrating a structure of the terminal TE. In the terminal TE, a cryptograph decoding circuit 21 for decoding the encrypted information obtained from the center CE, an information storage device 22 for keeping the information received via the satellite broadcasting line or the cable line and decoded by the cryptograph decoding circuit 21, a RAM 23 for copying temporary information of a control program from a ROM 27, a displaying circuit 24 for converting the information stored in the information storage device 22 into display character information or the like, an operation unit 25 for operating the terminal, a CPU 26 for executing the control program, and the ROM 27 for storing the control program and management information of the terminal TE including a terminal ID, an ability of the terminal and the like, are each connected to a system bus 28 of the CPU 26 comprising a data bus, address bus and control bus.

The displaying circuit 24 is connected with a display unit 29 for displaying character information or the like supplied from the displaying circuit 24 and the cryptograph decoding circuit 21 is connected with a communication interface section 30 for receiving information from the cable line and a satellite line interface section 31 for receiving information from the satellite broadcasting line.

The information offering system in which the satellite broadcasting line, i.e. first transmitting means, is used to transmit partial information and the line transmission line by means of the cable, i.e. second transmitting means, is used to make a request for information and to obtain whole information may be thus constructed by combining the center CE and the terminals TE shown in FIGS. 2 and 3 above.

Figure 4:
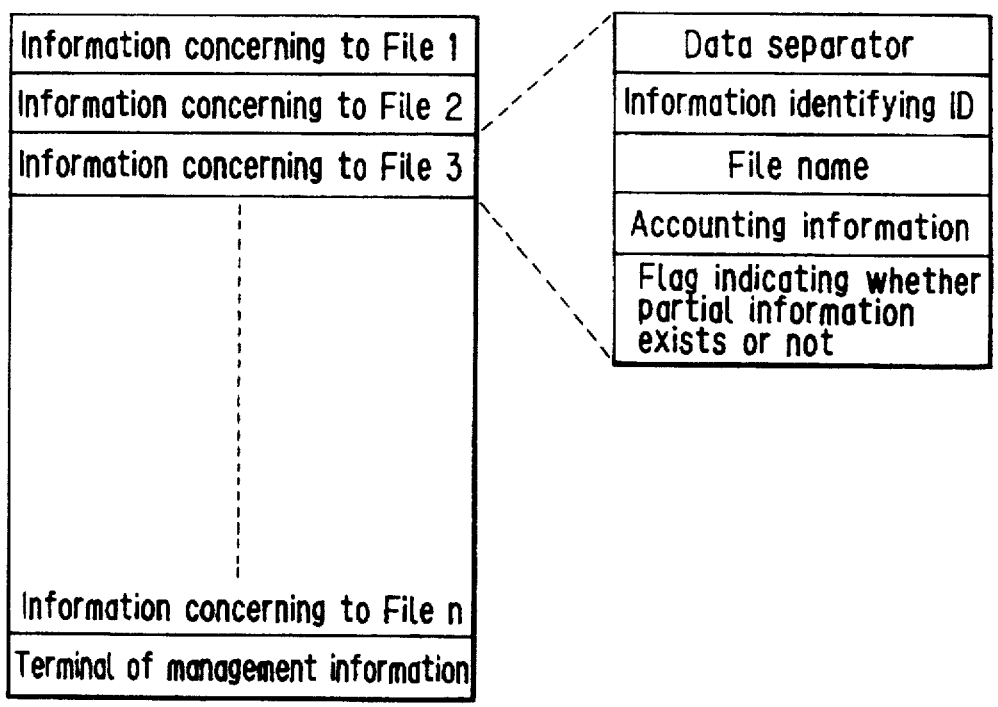
FIG. 4 is a structural table showing an arrangement of partial information, used in the present invention.

The information stored in the information storage device 1 of the center CE includes two types of information: partial information (sample information) which is a cutout part of the information and whole information from which the partial information originates. FIG. 4 shows a structure of management information of the partial information stored in the information storage device 1. As shown in FIG. 4, the management information includes a data separator for each information (file 1 through n) and comprises an information identifying ID indicating a location where the whole information is stored, a file name of the information, accounting information which shows a price in obtaining the whole information and a flag indicating whether the partial information (sample information) cut out of the whole information exists or not.

Operations in transmitting partial information from the center CE to the terminal TE in the broadcasting mode and in obtaining whole information together by using the communication line by mean of the cable after the user has retrieved the partial information will be explained below by using flowcharts.

A procedure for sending out partial information by using the satellite broadcasting line from the center CE operated by the information offerer will be explained at first with reference to FIG. 5.

Figure 5:
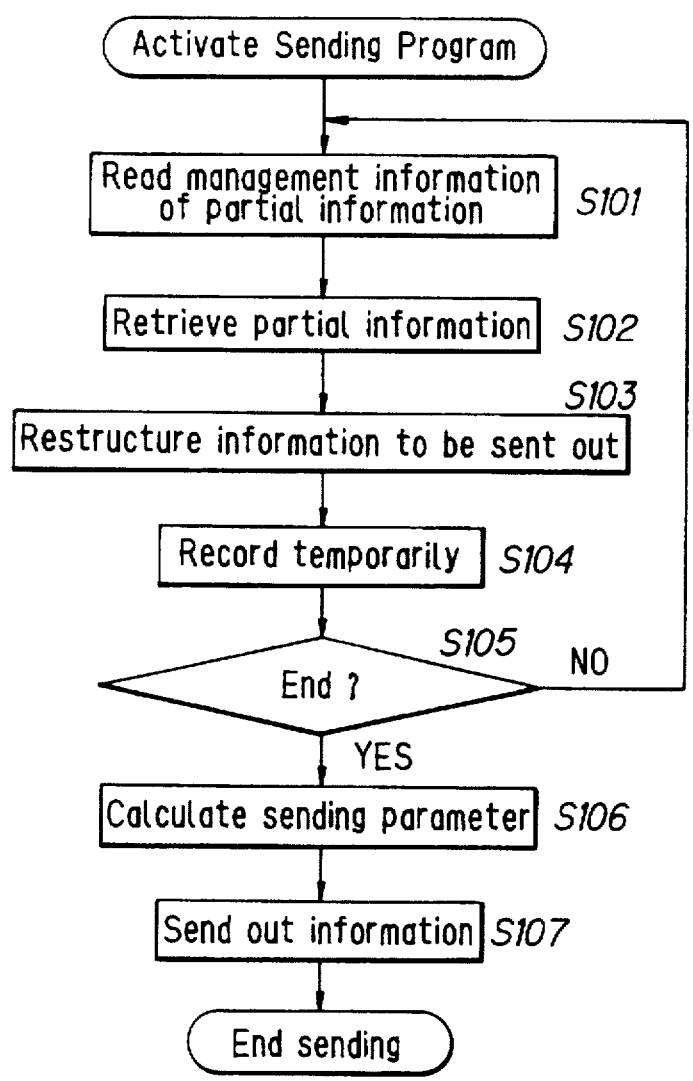
FIG. 5 is a flowchart showing operations of the center shown in FIG. 2.

In the flowchart shown in FIG. 5, the CPU 4 in the center CE periodically activates a sending program at first. In Step 101, the CPU 4 reads management information (directory information) of partial information stored in the information storage device 1. It then reads, from such information, an information identifying ID, file name, accounting information which is a price in obtaining the whole information and flag indicating whether the partial information cut out of the whole information exists or not and copies them to the RAM 5. Next, when the partial information exists, it retrieves the pertinent partial information from a pertinent address in the information storage device 1 and copies it to the RAM 5 in Step 102. Then, in Step 103, the CPU 4 restructures the information identifying ID, file name, accounting information, flag indicating whether the partial information exists or not and the partial information, when it exists, into successive information. For example, the data is restructured so that the partial information is added to the management information of each partial information shown in FIG. 4. Note that the restructuring is not necessary, but is provided nevertheless to facilitate manipulation of the partial information.

In Step 104, the restructured information is copied once into the information storage device 2. It is then determined in Step 105 whether a terminal of the management information to be transmitted has been reached or not. When ensuing management information exists, the CPU 4 returns to Step 101 to repetitively execute the processing from Step 101 to Step 104 described above until reaching to the terminal of the management information.

After finishing the above processing, the CPU 4 retrieves the information storage device 2 in Step 106 to find an information amount of the information temporarily recorded therein and keeps the information amount of the pertinent information in the RAM 5 as a sending parameter.

Then, finally in Step 107, the CPU 4 reads the sending parameter kept in the RAM 5 and the data to be transmitted stored in the information storage device 2 sequentially to send to the encrypting circuit 3 to encrypt them. The encrypted information is converted into a data format sendable to the line via the converting circuit 8 and is sent out from the satellite line interface section 10. Note that because the satellite line is used in transmitting the partial information to the terminal TE, an error rate is apt to be increased. Due to that, powerful or more error correcting codes are added to the partial information as compared to those in transmitting the whole information.

Figure 6:
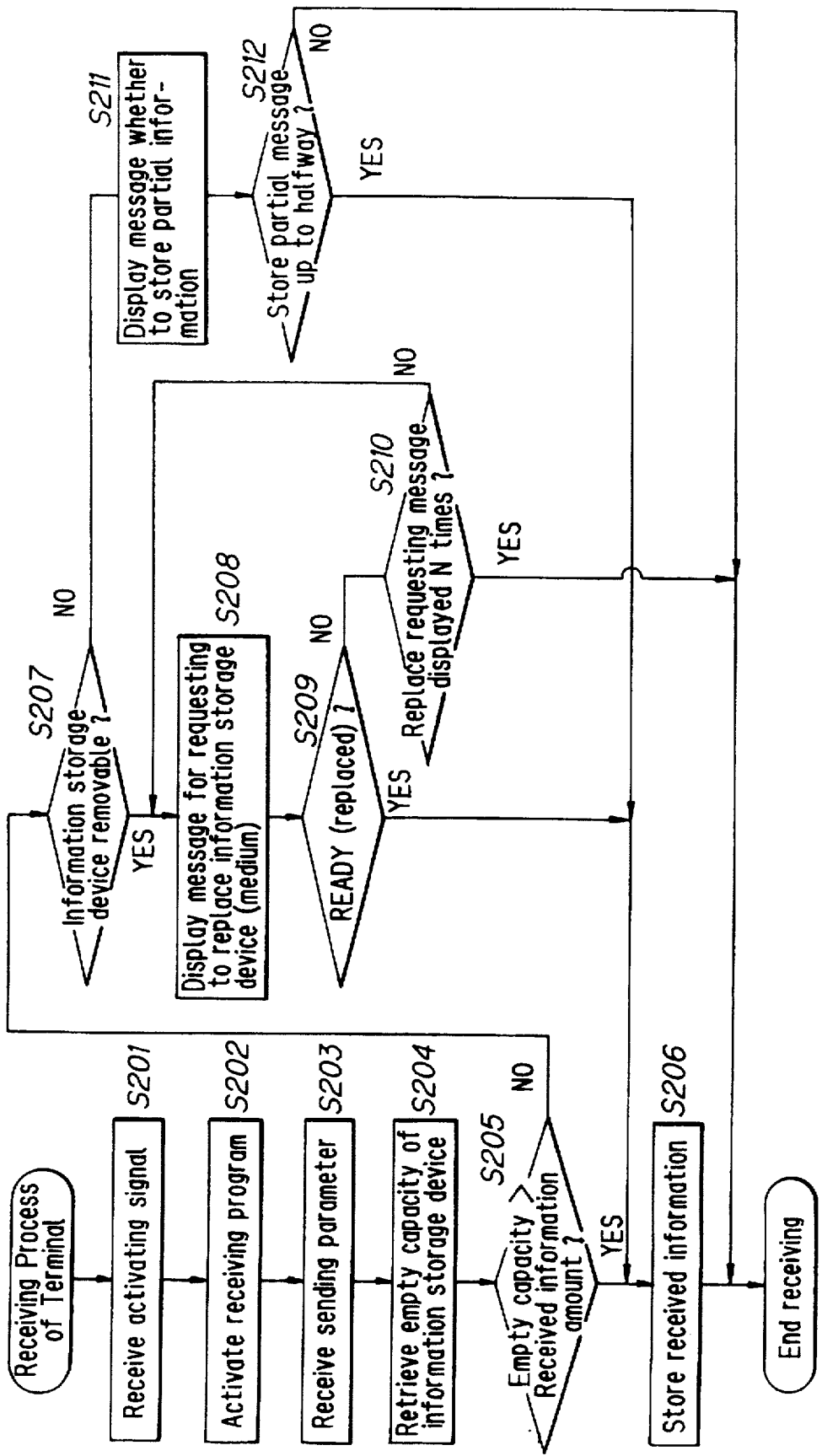
FIG. 6 is a flowchart showing operations of the terminal shown in FIG. 3.

Next, a procedure in receiving the information in the terminal TE, the user terminal, will be explained with reference to FIG. 6. When the information arrives at the satellite line interface section 31, a control signal for activation is sent from the satellite line interface section 31 to the CPU 26 in Step 201 at first. When the CPU 26 receives the control signal, an information receiving program stored in the ROM 27 is activated in Step 202. Then in Step 203, the CPU 26 reads the sending parameter received through the satellite line interface section 31.

Next, in Step 204, the CPU 26 retrieves the information storage device 22 to find a storable information amount. When it is determined in Step 205 that the information amount of the partial information indicated by the sending parameter is larger than the information amount storable in the information storage device 22 found in Step 204 (No), the process advances to Step 207. The receiving process is continued when it is determined in Step 205 that the information amount of the partial information is less than the storable information amount (Yes).

When it is determined to be Yes in Step 205, the CPU 26 decodes the information received from the satellite line interface section 31 by the cryptograph decoding circuit 21 and stores the decoded information signals in the information storage device 22.

In Step 207, it is determined whether the information storage device (medium) 22 of the terminal TE is removable or not. When the medium 22 is removable (Yes), a message requesting to replace the medium is displayed on the display unit 29 in Step 208. In Step 209, it is determined whether the replacement of the medium has been completed or not. When it has been completed (Yes), the receiving process is continued and when it has not been completed yet, the process advances to Step 210. In Step 210, it is determined whether Steps for displaying the message requesting to replace the medium, i.e. Step 208→Step 209→Step 210→Step 208 have been repeated by N times or not. When it has reached to N times (Yes), the receiving process is stopped. When it has not reached to N times (No), the process is shifted to Step 208.

When the medium 22 is not removable (No in Step 207) on the other hand, the process advances to Step 211. In Step 211, a message asking to the user whether the partial information should be received by an amount of the empty capacity of the medium 22 is displayed on the display unit 29. Then, in Step 212, it is determined whether an instruction to receive the partial information by the amount of the empty capacity of the medium 22 has been issued or not. When it has been issued (Yes), the receiving process is continued. When no instruction is issued or an instruction instructing not to receive is issued (No), the receiving process is stopped. Note that the above-mentioned messages are stored in the ROM 27 of the terminal TE in advance.

Figure 7:
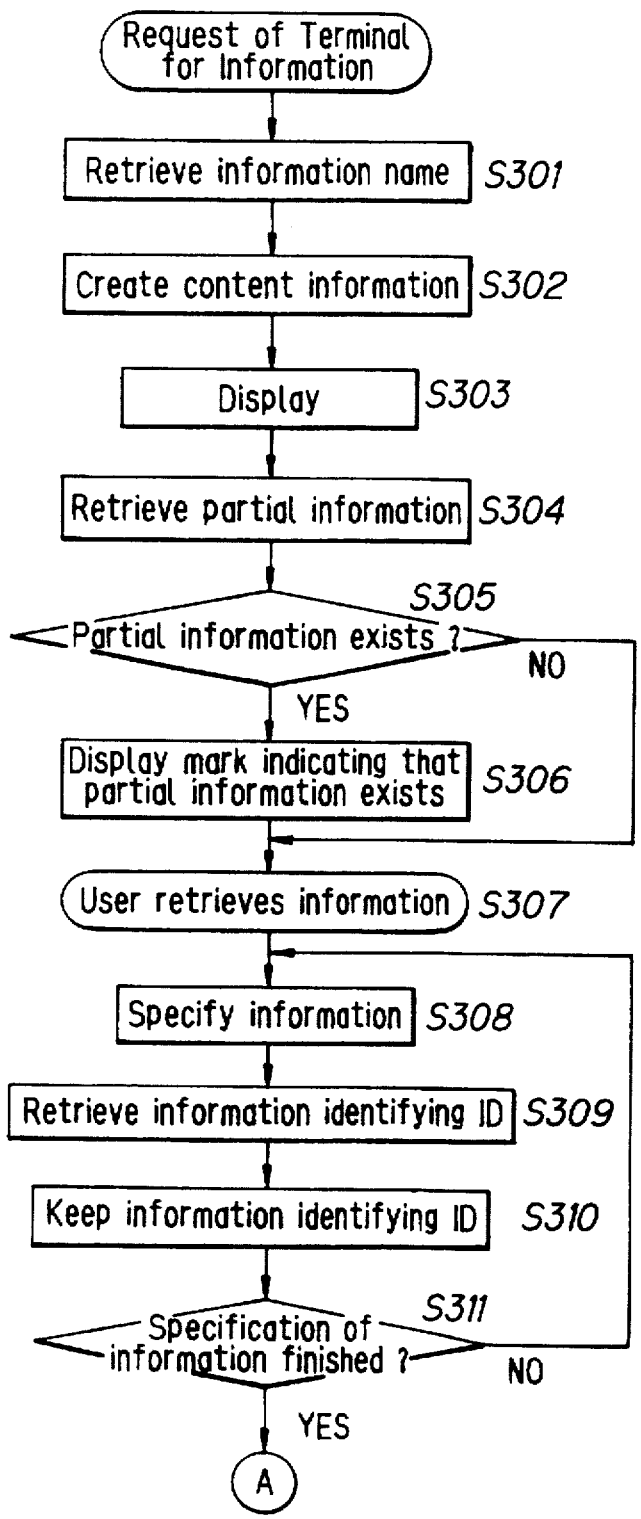
FIG. 7 is a flowchart for explaining an information specifying operation of the terminal after obtaining the partial information.

Next, operations of the terminal TE, i.e. the user terminal, after finishing the receiving process described above will be explained with reference to FIGS. 7 and 8. Operations related to displaying of the partial information and specification of necessary information in the terminal TE will be explained at first in accordance to a flowchart shown in FIG. 7. In Step 301, the CPU 26 retrieves the file name information from the received information stored in the information storage device 22. Next, in Step 302, the CPU 26 creates content information by using the retrieved file name. Then, in Step 303, the CPU 26 sends out the content information to the displaying circuit 24. The displaying circuit 24 converts the content information into visualized information such as character information and the converted visualized information is supplied to the display unit 29 to be displayed.

Next, in Step 304, the CPU 26 retrieves a flag (the flag indicating whether partial information exists or not described above) indicating whether demonstration information exists or not from the received information stored in the information storage device 22. When it is determined in Step 305 that the flag indicating the existence of partial information is "1" ("exists"), a mark which indicates that the partial information exists is added to the content information displayed in Step 303 in Step 306. When it is determined that the flag indicating the existence of partial information is "0" ("nil"), the process is shifted to Step 307 described below by bypassing Step 306.

When the user specifies information added with the mark indicating that the partial information exists in the contents displayed on the display unit 29 by the operation unit 25 in Step 307, the partial information such as a demonstration is displayed on the display unit 29 and the user can confirm its content. When there is information which the user desires to obtain, the user can specify the information to be transmitted by using the operation unit 25 in Step 308.

When the information to be transmitted is specified in Step 308, the CPU 26 receives an information specifying signal from the operation unit 25 and retrieves an information identifying ID of the pertinent information in Step 309. Then, in Step 309, the CPU 26 copies (keeps) the retrieved information identifying ID in a transmitting information area of the information storage device 22.

It is then determined in Step 311 whether the specification of the information desired by the user has been finished or not. When desired information exists in succession, the routine from Step 308 to Step 310 is repetitively executed. When it is detected by the input of the operation unit 25 that the specification of the information desired by the user has been finished, the information specifying routine ends.

Figure 8:
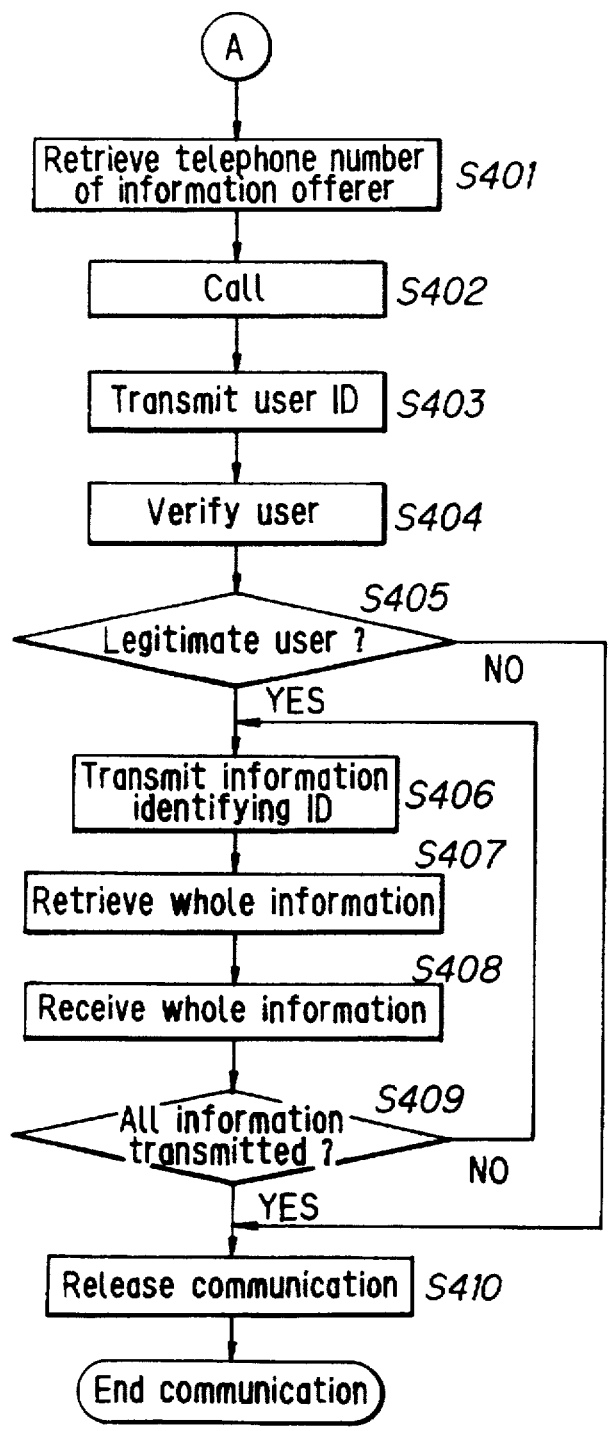
FIG. 8 is a flowchart for explaining operations of the terminal and center and showing a procedure for obtaining specified whole information.

Next, a procedure related to a request for the information specified by the user to the information offerer (center CE) and to transmission of the information from the center CE will be explained with reference to a flowchart shown in FIG. 8. When the specification of the information made by the user is finished, the CPU 26 of the terminal TE retrieves a subscriber telephone number of the information offerer recorded in the information storage device 22 in Step 401. Then, in Step 402, the CPU 26 makes a call to the center CE of the information offerer by using the read telephone number via the communication interface section 30. In Step 403, the CPU 26 sends out the user ID and calling number (e.g. the telephone number of the offerer) by using user's user information within a call setting message. The use of the user's user information allows to transmit data directly to the other party on the line without stopping at a switching machine. Therefore, the other party can receive the ID for example simultaneously when the line is connected and due to that, almost no fee is charged even if the ID is wrong.

On the other hand, the CPU 4 of the center CE, i.e. the information offerer, implements an authorizing process by the user ID and calling number contained in the user's user information received via the communication interface section 9 and the user management information stored in the information storage device 2 in Step 404. It compares the user ID and calling number with the user management information to verify whether the user is a legitimate user or not in Step 405. If the user is not authorized here (No), the CPU 4 of the center CE cuts off and releases the line by bypassing to Step 410.

When the user is authorized as being a legitimate user (Yes) in Step 405, the CPU 26 of the terminal TE reads the information identifying ID from the transmitting information area of the information storage device 22 and transmits it to the center CE via the communication interface section 30 in Step 406. Then, in Step 407, the CPU 4 of the center CE retrieves the pertinent whole information from the information storage device 1 based on the information identifying ID received via the communication interface section 9. In Step 408, the CPU 4 performs an encrypting process on the retrieved whole information by the encrypting circuit 3 and transmits it to the user terminal TE via the communication interface section 9. Then, in Step 409, it is determined whether all of the whole information specified by the terminal TE has been transmitted or not based on such information as End of File and Header normally added to data. When all of the whole information has not been transmitted yet (No), the routine from Step 406 to Step 409 is repetitively executed.

The user can obtain the desired information by the terminal TE through the processing described above. When the CPU 26 of the terminal TE confirms that the information has been received, it executes the process for releasing the line in Step 410.

Note that although the satellite broadcasting line using the broadcasting satellite SA has been used as the first communication mode in the embodiment described above, another broadcasting line may be used. Further, although the ISDN has been used as the second communication mode, it may be realized also by using a communication network such as an analog telephone network or another LAN.

As is apparent from the above explanation, the information offering system described in claim 1 is constructed so that the partial information transmitted from the center to the terminal is distributed in the broadcasting mode for example and the desired whole information is be specified by the terminal in the off-line mode from the received partial information, so that a large number of users can use a large amount of information in the information offering service. Further, because the user can retrieve the partial information obtained by the terminal in the off-line mode, the user can specify the desired information steadily without having his/her knowledge and/or skill level significantly affect the information retrieval time and information retrieval cost.

Furthermore, because the line or the host computer of the center is not used in retrieving the information, such inconveniences that the line is occupied or the utilization factor of the host computer drops may be avoided.

Further, the information offering system is constructed so that the partial information sent from the center is displayed visually on the display unit to allow the user to specify desired whole information by the operation unit. It is also constructed so that the necessary information specified by the operation unit is transmitted from the center to the terminal by the communication line using a cable for example. Accordingly, the user can specify and obtain the desired whole information based on the partial information visually displayed on the display unit and the specified whole information is taken in automatically from the center to the terminal.

According to the information offering system constructed as described in claim 3, because the partial information transmitted in the first communication mode and the whole information transmitted in the second communication mode each have a common information identifying ID, the whole information specified by the terminal side may be readily retrieved at the center side and the retrieval and transmission of information in the whole system is facilitated.

The information offering system described in claim 8 is constructed so that an information amount of the partial information to be sent from the center is compared with an empty capacity of the information storage device of the terminal and a series of partial information is transmitted from the center to the terminal in batch when adequate capacity is assured at the terminal side. Thereby, guaranteeing that complete information is always transmitted to the terminal and avoiding instances in which incomplete information is transmitted in response to user commands.

According to the information offering system constructed as described in claim 9, because the broadcasting mode by means of antenna radio wave is adopted as the first communication mode and the on-line mode by means of the cable is adopted as the second communication mode, the partial information may be offered in a broad range and the whole information may be offered only to the users needing the information in the on-line mode using the cable line, thereby reducing system operating costs.

While the present invention has been particularly shown and described in conjunction with preferred embodiments thereof, it will be readily appreciated by those of ordinary skill in the art that various changes may be made without departing from the spirit and scope of the invention. Therefore, it is intended that the appended claims be interpreted as including the embodiments described herein, the alternatives mentioned above, and all equivalents thereto.

What is claimed is:

1. An information supplying system comprising a center which supplies information and terminals which receive the information supplied from said center, said center comprising:

first storage means for storing whole information to be supplied for said terminal;

first transmitting means for transmitting partial information containing part of said whole information stored in said first storage means to said terminal in a first communication mode; and second transmitting means for transmitting said whole information specified by said terminal based on said partial information to said terminal in a second communication mode: and said terminal comprising:

first receiving means for receiving said partial information transmitted by said first transmitting means of said center;

second storage means for storing said partial information received by said first receiving means;

displaying means for reading said partial information stored in said second storage means to display on a screen;

information specifying means for generating, by referencing said partial information displayed on said screen, an instruction signal for instructing said center to transmit said whole information which corresponds to said partial information and for transmitting said instruction signal to said center in either said first or second communication mode; and second receiving means for receiving said whole information transmitted by said second transmitting means in response to said instruction signal.

2. The information supplying system according to claim 1, wherein said partial information is stored in said first storage means in advance.

3. The information supplying system according to claim 1, wherein said partial information contains an ID indicating a storage location of said whole information in said first storage means, a file name of said whole information and a sample information created by cutting out information from said whole information.

4. The information supplying system according to claim 3, wherein said center further comprises means for generating a parameter representing an information amount of said partial information and said first transmitting means transmits information in order of said parameter, said ID, said file name and said sample information to said terminal.

5. The information supplying system according to claim 3, wherein said terminal further comprises means for creating content information by using said file name contained in said partial information and said displaying means displays said content information on the screen.

6. The information supplying system according to claim 5, wherein said terminal further comprises means for specifying said corresponding sample information from said content information and said displaying means displays said specified sample information on the screen.

7. The information supplying system according to claim 6, wherein said instruction signal contains a user ID, said center further comprises means for determining, upon receiving said instruction signal, whether the pertinent user is a legitimate user or not based on said user ID, and said second transmitting means transmits said whole information to said terminal only when said user is determined to be a legitimate user by said determining means.

8. The information supplying system according to claim 4, wherein said terminal further comprises:

means for comparing said parameter with a storable capacity of said second storage means and outputting the comparison result;

means for determining whether all of said partial information can be written into said second storage means based on said comparison result; and writing means for writing all of said partial information into said second storage means when it is determined to be writable.

9. The information supplying system according to claim 1, wherein said first communication mode is a broadcasting radio wave line and said second communication mode is a cable line.

10. An information supplying system comprising a center which supplies information and terminals which receive the information supplied from said center, said center comprising:

first storage means for storing whole information to be supplied for said terminal;

first transmitting means for transmitting partial information containing part of said whole information stored in said first storage means to said terminal in a first communication mode; and second transmitting means for transmitting said whole information specified by said terminal based on said partial information to said terminal in a second communication mode; and said terminal comprising:

first receiving means for receiving said partial information transmitted by said first transmitting means of said center;

second storage means for storing said partial information received by said first receiving means;

information specifying means for generating, by referencing said partial information, an instruction signal for instructing said center to transmit said whole information which corresponds to said partial information and for transmitting said instruction signal to said center in either said first or second communication mode; and second receiving means for receiving said whole information transmitted by said second transmitting means in response to said instruction signal.

11. A method for transmitting and receiving information between a center which supplies information and terminals which receive the information supplied from said center, comprising:

a first transmitting step of transmitting partial information containing part of whole information to be supplied for said terminal and stored in first storage means from said center to said terminal in a first communication mode;

a second transmitting step of transmitting said whole information specified by said terminal based on said partial information supplied from said center to said terminal in a second communication mode;

a first receiving step of receiving said partial information transmitted from said center in said first communication mode;

a step of storing said received partial information in second storage means of said terminal;

a displaying step of reading said partial information stored in said second storage means to display on a screen of said terminal;

an information specifying step of generating, by referencing said partial information displayed on said screen, an instruction signal for instructing said center to transmit said whole information which corresponds to said partial information, and for transmitting said instruction signal from said terminal to said center in either said first or second communication mode; and a step of receiving said whole information transmitted in response to said instruction signal from said center in said second communication mode.

12. The method for transmitting and receiving information according to claim 11, wherein said partial information is stored in said first storage means in advance.

13. The method for transmitting and receiving information according to claim 11, wherein said partial information contains an ID indicating a storage location of said whole information in said first storage means, a file name of said whole information and a sample information created by cutting out information from said whole information.

14. The method for transmitting and receiving information according to claim 13, further comprising, in said center, a step of generating a parameter representing an information amount of said partial information:

the information being transmitted in order of said parameter, said ID, said file name and said sample information supplied from said center to said terminal in said first transmitting step.

15. The method for transmitting and receiving information according to claim 13, further comprising, in said terminal, a step of creating content information by using said file name contained in said partial information:

said content information being displayed on the screen in said displaying step.

16. The method for transmitting and receiving information according to claim 15, further comprising, in said terminal, a step of specifying said corresponding sample information from said content information:

said specified sample information being displayed on the screen in said displaying step.

17. The method for transmitting and receiving information according to claim 16, wherein said instruction signal contains a user ID, and further comprising, in said center, a step of determining whether the pertinent user is a legitimate user or not based on said user ID upon receiving said instruction signal:

said whole information being transmitted from said center to said terminal only when said user is determined to be a legitimate user in said determining step in said second transmitting step.

18. The method for transmitting and receiving information according to claim 14, further comprising, in said terminal:

a step of comparing said parameter with a storable capacity of said second storage means and outputting the comparison result;

a step of determining whether all of said partial information can be written into said second storage means based on said comparison result; and a writing step of writing all of said partial information into said second storage means when it is determined to be writable.

19. The method for transmitting and receiving information according to claim 11, wherein said first communication mode is a broadcasting radio wave line and said second communication mode is a cable line.

20. A terminal to which information is supplied from an information service center, comprising:

first receiving means for receiving partial information transmitted from said information service center in a first communication mode, said partial information containing part of whole information to be supplied from said information service center;

storage means for storing said partial information received by said first receiving means;

displaying means for reading said partial information stored in said storage means to display on a screen;

information specifying means for generating, by referencing said partial information displayed on said screen, an instruction signal for instructing said information service center to transmit said whole information which corresponds to said partial information, and for transmitting said instruction signal to said information service center in a second communication mode; and second receiving means for receiving said whole information transmitted from said information service center in response to said instruction signal in said second communication mode.

21. The terminal according to claim 20, wherein said partial information contains an ID indicating a storage location of said whole information in storage means of said information service center, a file name of said whole information and a sample information created by cutting out information from said whole information.

22. The terminal according to claim 21, wherein said information service center transmits information in order of a parameter indicating an information amount of said partial information, said ID, said file name and said sample information to said terminal.

23. The terminal according to claim 21, further comprising means for creating content information by using said file name contained in said partial information: said displaying means displaying said content information on the screen.

24. The terminal according to claim 23, further comprising means for specifying said corresponding sample information from said content information:

said displaying means displaying said specified sample information on the screen.

25. The terminal according to claim 20, wherein said instruction signal contains a user ID;

said ID being used in said information service center to determine whether the pertinent user is a legitimate user or not; and said whole information being transmitted to said terminal only when said user is determined to be a legitimate user in said information service center.

26. The terminal according to claim 22, further comprising:

means for comparing said parameter with a storable capacity of said storage means of said terminal and outputting the comparison result;

means for determining whether all of said partial information can be written into said storage means based on said comparison result; and writing means for writing all of said partial information into said storage means when it is determined to be writable.

27. The terminal according to claim 20, wherein said first communication mode is a broadcasting radio wave line and said second communication mode is a cable line.

28. An information service center for supplying information to a terminal, comprising:

storage means for storing whole information and partial information being stored in advance of supplying said information to said terminal, said whole information to be supplied to said terminal, and said partial information including an ID indicating a storage location of said whole information in said storage means, a file name of said whole information and a sample information created by cutting out information from said whole information;

first transmitting means for transmitting said partial information to said terminal in a first communication mode; and second transmitting means for transmitting said whole information specified by said terminal based on said partial information to said terminal in a second communication mode.

29. The information service center according to claim 28, further comprising means for generating a parameter representing an information amount of said partial information:

said first transmitting means transmitting information in order of said parameter, said ID, said file name and said sample information to said terminal.

30. The information service center according to claim 28, further comprising determining means for determining whether the pertinent user is a legitimate user or not based on a user ID transmitted from said terminal:

said second transmitting means transmitting said whole information to said terminal only when said user is determined to be a legitimate user by said determining means.

* * * * *